UNITED STATES PATENT OFFICE.

J. AUGUSTUS ROTH, OF PHILADELPHIA, PENNSYLVANIA.

IMPROVED FIBROUS MATERIAL FROM CORNSTALKS.

Specification forming part of Letters Patent No. 41,642, dated February 16, 1864.

*To all whom it may concern:*

Be it known that I, J. AUGUSTUS ROTH, of the city of Philadelphia, and State of Pennsylvania, have invented a new and useful chemical process—viz., the art of producing from the stalk of Indian corn material of such fibrous nature fitted for the manufacture of white paper, and also for spinning purposes, to be worked into cloth, cord, &c.; and I do hereby declare that the following is a full, clear, and exact description of my process, which I have discovered to be practical on a large scale by a series of experiments made within the last two years, reference being had to the accompanying samples, which show the different stages of the fibers made of cornstalks.

It is well known that the straw or stalks of Indian corn, so plentifully raised by all farmers in America, have been considered and treated heretofore as waste, with the exception of the leaves, and in some cases the soft portions of the stalk, which are used as fodder for cattle. It is also known that attempts have been made by men professing to be versed and acquainted with the proper applications of chemical agents for the purpose of obtaining the fibers of the cornstalk in a state suitable for use in the arts and manufacturing of textile material; but by my experiments I have discovered that the nature of the cornstalk—that is, its natural composition of various substances contained and combined with the same—has not been understood or attended to, so as to make a clear description of its treatment and uses of chemical agents applied to obtain the desired result and effect named. I will therefore proceed to describe my discovery in such terms and specifications to be understood by others skilled in the art of working and using textile fibers in the manufacture of paper, cloth, &c., and thereby give a complete practical process for its use. I have discovered that the stalks of Indian corn contain, besides its quality of fibers, a gelatine of sugary nature, tannin, carbonic acid, and water saturated with those components of the stalk. I have found that if lime alone, or lime accompanied with alkalines, is employed as the softening or solving chemical agent in boiling the cornstalk therewith the latent coloring-matter, tannin, &c., is raised, fastened, or etched to the fibers, causing a great detriment to the subsequent cleansing and bleaching processes, consisting in the waste of time and bleaching agents, as well as the destruction of the fibers. If I want to prepare my cornstalk for the manufacture of paper, I cut the stalk or straw in lengths of about two inches, on any suitable cutter, such as are now used for cutting straw, &c. I then pass this cut stalk between a pair of fluted rollers, between which it is mashed previous to its being subjected to the liquid agents. Having thus prepared my stalk for paper, I subject the same to a thorough boiling in water, in a tank or other suitable reservoir, which I continue for six to eight hours, for the purpose of solving the components of the stalk, and then abstracting the same by the addition of water, which I run through the contents of the tank. After the water has been entirely run out of the tank I fill it up with my chemical agent for the purpose of softening and separating the fibers, as well as to create the requisite adhesion for paper-stock. When the tank, or a boiler, or any suitable reservoir has been filled, as described, I boil its contents for a space of eight hours, when it will be found sufficiently solved and softened and ready for the reduction in the hollander.

I prepare my chemical agent as follows, viz.: I take, as a scale, three pounds of sal-soda and one-fourth pound of lime, which I boil together with about two gallons of water, in order and for the purpose of ridding the alkali of its carbonic acid, which is taken up by the lime, forming carbonate of lime. After boiling this liquid for about thirty minutes I stop its boiling and allow it to clear, the carbonate of lime settling down to the bottom of the tank, leaving the liquid clear and entirely free of any portion of lime. This so prepared liquid I draw off by a spigot inserted some distance—say four to six inches—above the surface or upper line of the lime in the tank and run the clear liquid by a trough or leaden pipe into the tank containing the material to be treated, taking good care, however, that no lime is carried over into the tank containing the cornstalk, which, if allowed, would damage the fibers to be obtained, cleansed, and bleached. When the stalk has been boiled sufficient the liquid is run off the stalk removed to the hollander to reduce it to paper-pulp, where it is washed while being in the operation of reduction. I find that after the stalk has been reduced and washed it still contains an oily substance adverse to the requisite affinity for the application of the chlorine bleaching agent; and for the purpose of creating this requisite affinity I first neutralize the oily substance by the application of a small portion of sulphuric acid added to the water containing the pulp, after which I apply the bleaching agents to fully whiten the pulp for paper.

When I want to make use of the fibers for spinning purposes I cut the cornstalk in lengths of about six inches and treat the same as described; but instead of washing the prepared material in a hollander I confine the same in bags, which are placed in a dash-wheel and therein washed, after which the fibrous mass may be dried, carded, spun, and wove into cloth, bleached or dyed at pleasure.

Having thus described my process of obtaining the fibers of cornstalks suitable for the manufacture of paper, cord, and cloth, I will now state what I claim as my invention and desire to secure by Letters Patent.

I do not claim the use of lime alone, or when accompanied with soda or other alkalines, for the purpose of boiling together with the same the stalks of Indian corn; but I do claim—

1. The solving and abstracting of the components of the stalks of Indian corn by the application of one or more water baths in a boiling state over 212° Fahrenheit, as described.

2. The use of the chemical agent after the water bath or the boiling of the material under treatment has been completed, in the manner and for the purpose as described.

3. The combination of treatment or process of the fibers of the stalks of Indian corn, as described, and also the neutralizing of substances still adhering to the fibers after being washed by the application of sulphuric acid or its equivalent, in the manner and for the purpose specified.

J. AUGUSTUS ROTH.

Witnesses:
E. H. BALES,
JOHN BALL.